(12) United States Patent
Larsen

(10) Patent No.: US 11,324,354 B2
(45) Date of Patent: May 10, 2022

(54) THERMOS COFFEE MAKER

(71) Applicant: Greg Larsen, Novato, CA (US)

(72) Inventor: Greg Larsen, Novato, CA (US)

(\*) Notice: Subject to any disclaimer, the term of this patent is extended or adjusted under 35 U.S.C. 154(b) by 286 days.

(21) Appl. No.: 16/583,186

(22) Filed: Sep. 25, 2019

(65) Prior Publication Data

US 2020/0093313 A1 Mar. 26, 2020

Related U.S. Application Data

(60) Provisional application No. 62/737,004, filed on Sep. 26, 2018.

(51) Int. Cl.
*A47J 31/00* (2006.01)
*A47J 31/06* (2006.01)
*A47J 41/00* (2006.01)
*A47J 31/18* (2006.01)

(52) U.S. Cl.
CPC ......... *A47J 31/005* (2013.01); *A47J 31/0626* (2013.01); *A47J 31/18* (2013.01); *A47J 41/0072* (2013.01); *A47J 2202/00* (2013.01)

(58) Field of Classification Search
CPC ........ A47J 31/18; A47J 31/20; A47J 31/0626; A47J 31/005
See application file for complete search history.

(56) References Cited

U.S. PATENT DOCUMENTS

| 9,801,492 B1* | 10/2017 | Lin .......................... A47J 31/20 |
| 2008/0173183 A1* | 7/2008 | Chen ....................... A47J 31/02 99/285 |
| 2012/0074143 A1* | 3/2012 | Lin ...................... A47J 41/0027 220/259.4 |
| 2016/0192797 A1* | 7/2016 | Yang ...................... B65D 53/02 220/592.17 |
| 2017/0265674 A1* | 9/2017 | Liu ......................... A47J 31/20 |

FOREIGN PATENT DOCUMENTS

DE 202016100113 U1 * 2/2016 .............. A47J 31/18

\* cited by examiner

*Primary Examiner* — John J Norton
(74) *Attorney, Agent, or Firm* — Ivan E. Rozek; Savantek Patent Services

(57) ABSTRACT

A Thermos Coffee Maker having a main thermos body, a lid member, a screen member and a screen retaining assembly. The screen retaining assembly includes a threaded cylindrical member and a screen retaining ring. The lid has internal threads and is attached to the upper portion of the screen retaining assembly. The screen retaining assembly is attached at its lower end to the internally threaded portion of the main thermos body. The screen is trapped between the screen retaining ring and a ledge located on the interior of the screen retaining assembly. The user to pours ground coffee into the main thermos body then pours in hot water and screws on the lid. The coffee is allowed to brew-steep. The brewed coffee can be poured through the screen member thereby blocking the coffee grounds and allowing brewed coffee to be poured from the main thermos to a coffee cup.

9 Claims, 14 Drawing Sheets

THERMOS COFFEE MAKER

CROSS REFERENCE TO RELATED APPLICATIONS

Provisional patent application No. 62/737,004 filed on Sep. 26, 2018.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND OF THE INVENTION

This invention relates generally to the field of coffee makers and more specifically to brewing coffee inside a thermos, not just pouring or dripping brewed coffee into a thermos.

Coffee is a beverage made from ground roasted coffee beans. It is brewed using hot water and can then be served either hot or cold. It can be made in a variety of ways including pouring the grounds into a paper or fine mesh metal filter and pouring hot water over them and letting the coffee infused water fall into a cup or larger receptacle. Other methods include using a percolator, or a flash heating coffee maker or a French press coffee maker. The brewed coffee is often poured into a thermos for transporting to work or play and to keep the coffee hot for extended periods of time.

However, it would be faster and more convenient if the coffee could be brewed right inside of the thermos thereby eliminating the need to brew the coffee in a separate container first. Brewing coffee inside a closed, sealed thermos also generates internal pressure within the thermos that seems to noticeably improve the smoothness (less bitterness) of the coffee. Traditional brewing methods do not do this.

BRIEF SUMMARY OF THE INVENTION

The primary object of the invention is to provide a thermos that is capable of brewing coffee.

Another object of the invention is to provide a coffee making thermos that becomes pressurized when steaming hot water is introduced thereby increasing the smoothness of the brewed coffee.

Another object of the invention is to provide a coffee making thermos with an integrated screen to hold back any solids, ie. coffee grounds or teas leaves, during a pour event.

Another object of the invention is to provide a coffee making thermos that includes a closeable pour spout.

Another object of the invention is to provide a coffee making thermos that is transportable, ie. can brew coffee on the way to one's destination and dispense coffee at the destination merely by lifting the pour spout and pouring.

A further object of the invention is to provide a coffee making thermos that includes a coffee type indicator, ie. decaf or regular.

Yet another object of the invention is to provide a coffee making thermos that includes a temperature indicator telling the temperature of the contents of the thermos.

Still yet another object of the invention is to provide a coffee making thermos whose handle, in the down position, prevents accidental rolling.

Another object of the invention is to provide a coffee making thermos that allows the user to capture used coffee grounds in the cap section for easy disposal of the grounds.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a Thermos Coffee Maker comprising: a main thermos body, a lid member, a screen member, a screen retaining assembly, a lid gasket, a screen retaining assembly gasket, said main thermos body having an open top where said top includes internal threads, said screen retaining assembly including an upper and lower externally threaded cylindrical member and a screen retaining ring, said lid member having internal threads that can be threadably attached to the upper portion of said screen retaining assembly, said screen retaining assembly can be threadably attached at its lower end to the upper internally threaded portion of said main thermos body, said lid gasket located between the lower portion of said lid and an external ring located on the outer midsection of said screen retaining assembly, said screen retaining assembly gasket located between the lower surface of said screen retaining assembly and the upper surface of said main thermos body, said screen member trapped between said screen retaining ring and a I edge located on the interior mid-section of said screen retaining assembly, allowing a user to pour ground coffee into said main thermos body, pouring hot water, screw on said lid member and said screen retaining assembly, allow said coffee to brew-steep, and pour said coffee out of said main thermos body and through said screen member thereby blocking said coffee grounds and allowing brewed coffee to be poured from said main thermos body into a cup or other receptacle.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
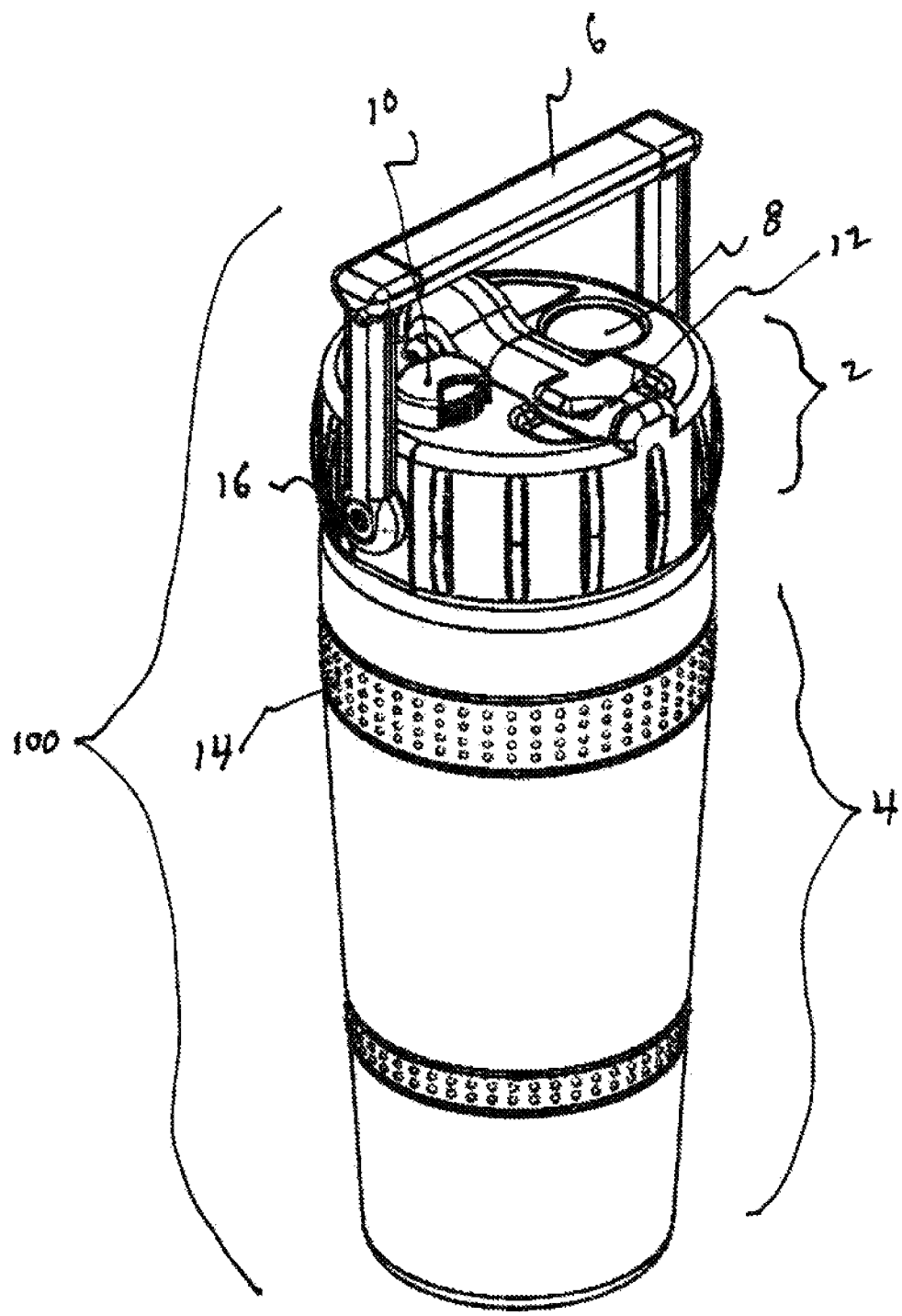
FIG. 1 is a perspective view of the invention.

Referring now to FIG. 1 we see a perspective view of the invention 100. A main thermos body 4 is a double walled stainless-steel construction and can hold hot coffee or other beverages. The lid assembly 2 is made of food grade injection molded plastic and holds the liquid in place and pressurizes the internal area of the thermos thereby improving the smoothness of the coffee based on empirical tests. The lid 2 may also be made of stainless steel and simply be a threaded cap with no other distinguishing features, or, as in the present embodiment, may be made of a combination of plastic and stainless steel and includes a pour spout 12, a handle 6, a thermometer 8, and a coffee type indicator selection knob 10.

Figure 2:
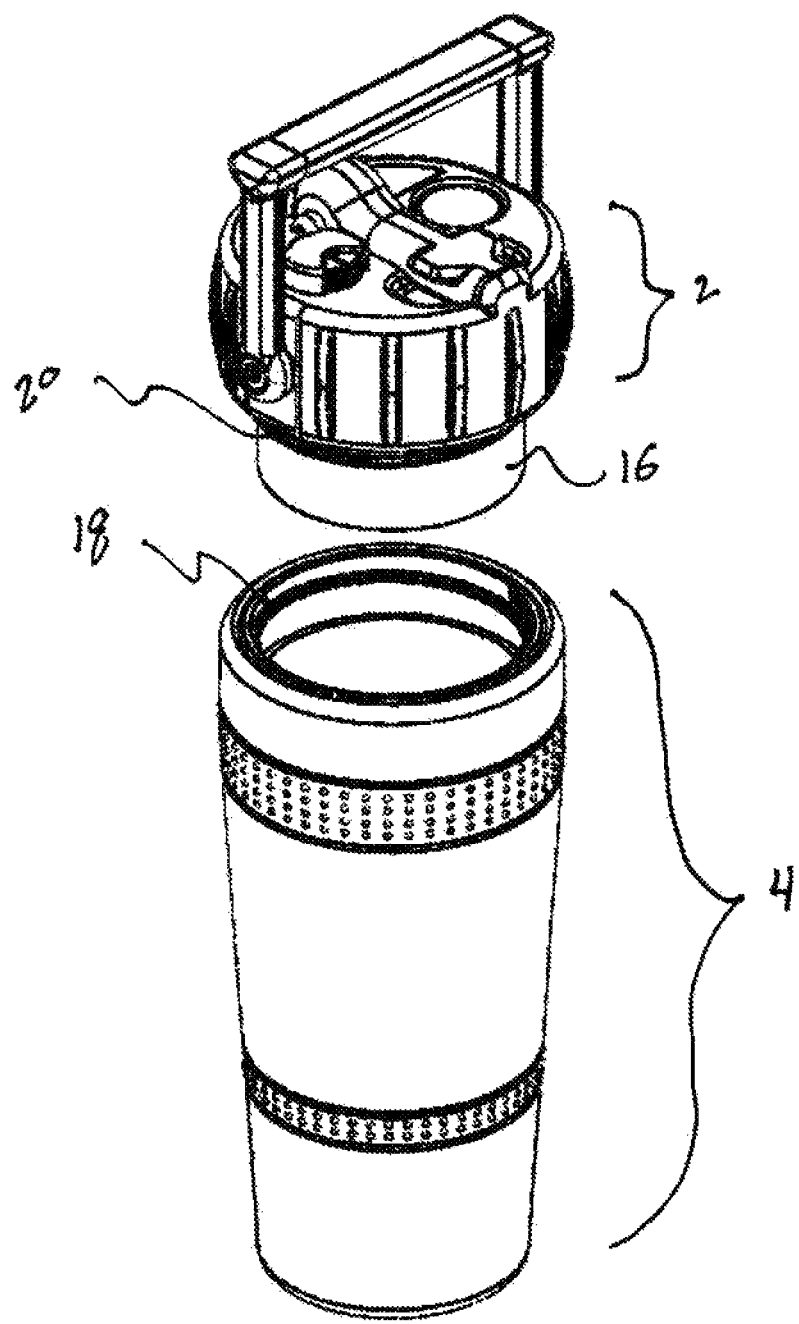
FIG. 2 is a perspective view with the lid and screen retaining assembly removed.

FIG. 2 is a perspective view showing the lid 2 and screen retaining assembly 16 removed from thermos 4. The screen retaining assembly is made of stainless steel and is threadably attached to the thermos by threads 20 that engage female threads 18 of the thermos 4.

Figure 3:
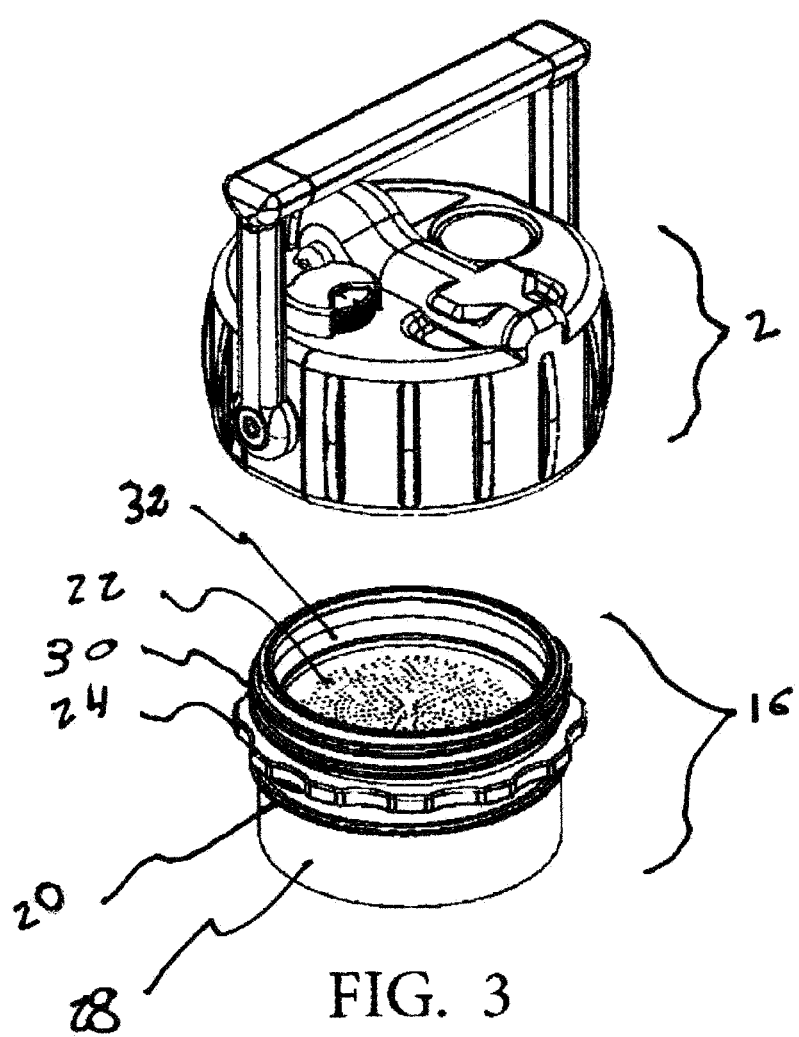
FIG. 3 is a perspective view of the screen retaining assembly separated from the lid.

FIG. 3 is a perspective view of the lid 2 with the screen retaining assembly 16 removed. The scalloped portion of outer ring 24 allows the user to grasp and turn the screen retaining assembly 16 when either attaching or detaching it from the lid 2 or the thermos 4. An internal ring 32 traps screen member 22 in place within the screen retaining assembly 16. Threads 30 can engage matching female threads in lid 2. Threads 20 can engage matching female threads on the inside wall of thermos 2. Lower cylindrical portion 28 is sized to be able to retain the coffee grounds after they have been used to brew coffee. Basically, the user turns the thermos upside down and lets the used grounds fall into the cylindrical portion 28. Then the user unscrews the screen retaining assembly from the thermos and pours out the ground in the cylindrical portion 28 for disposal into the nearest trash receptacle or recycling bin.

Figure 4:
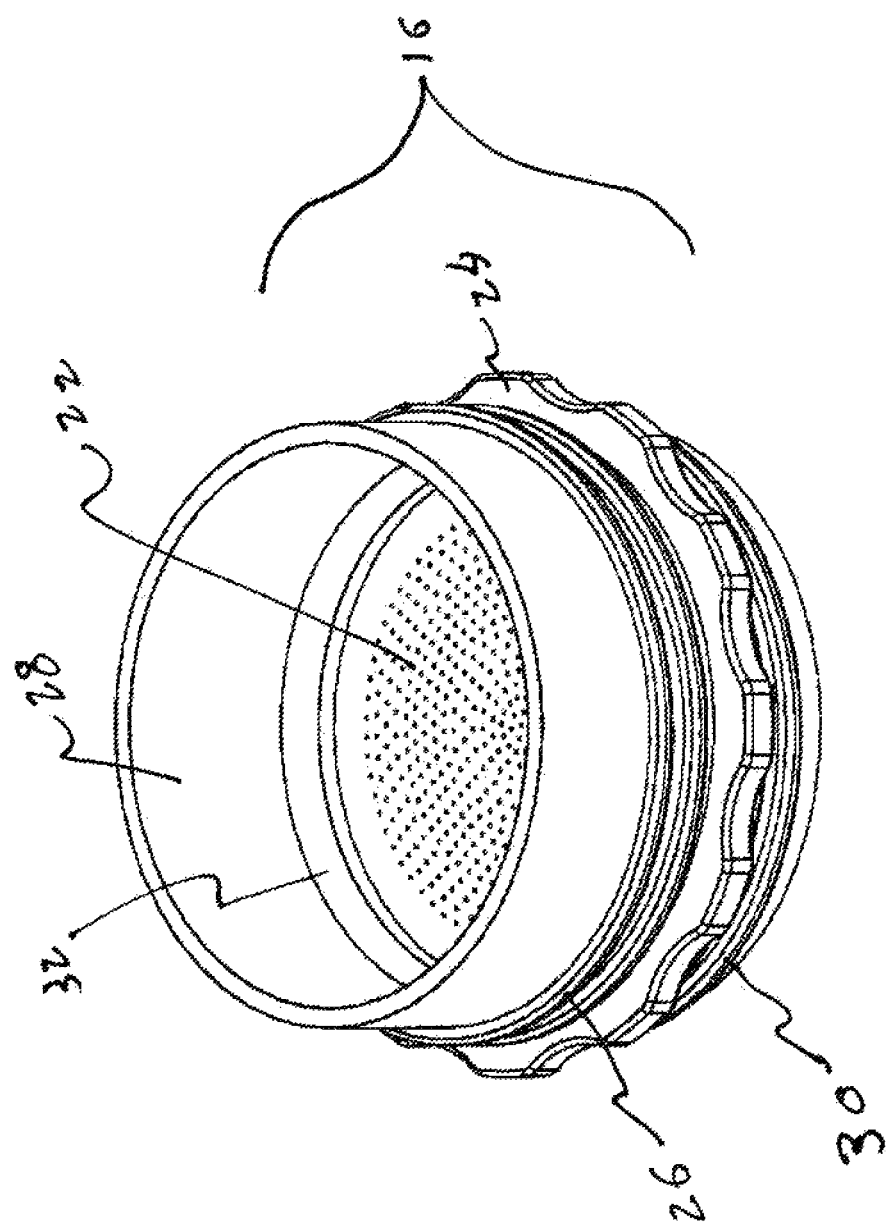
FIG. 4 is a perspective view of the screen retaining assembly turned upside down.

FIG. 4 is a perspective view of the screen retaining assembly 16 where the assembly is turned upside down to show the interior or cylindrical portion 28. An interior ring 32 acts in combination with ring 32 to trap the screen member 22. The height of wall 28 is equal to the height of used coffee grounds so that when the user turns the thermos upside down and removes the screen retaining assembly, the grounds are in the cup shape formed by wall 28 and screen member 22, and ready for disposal.

Figure 5:
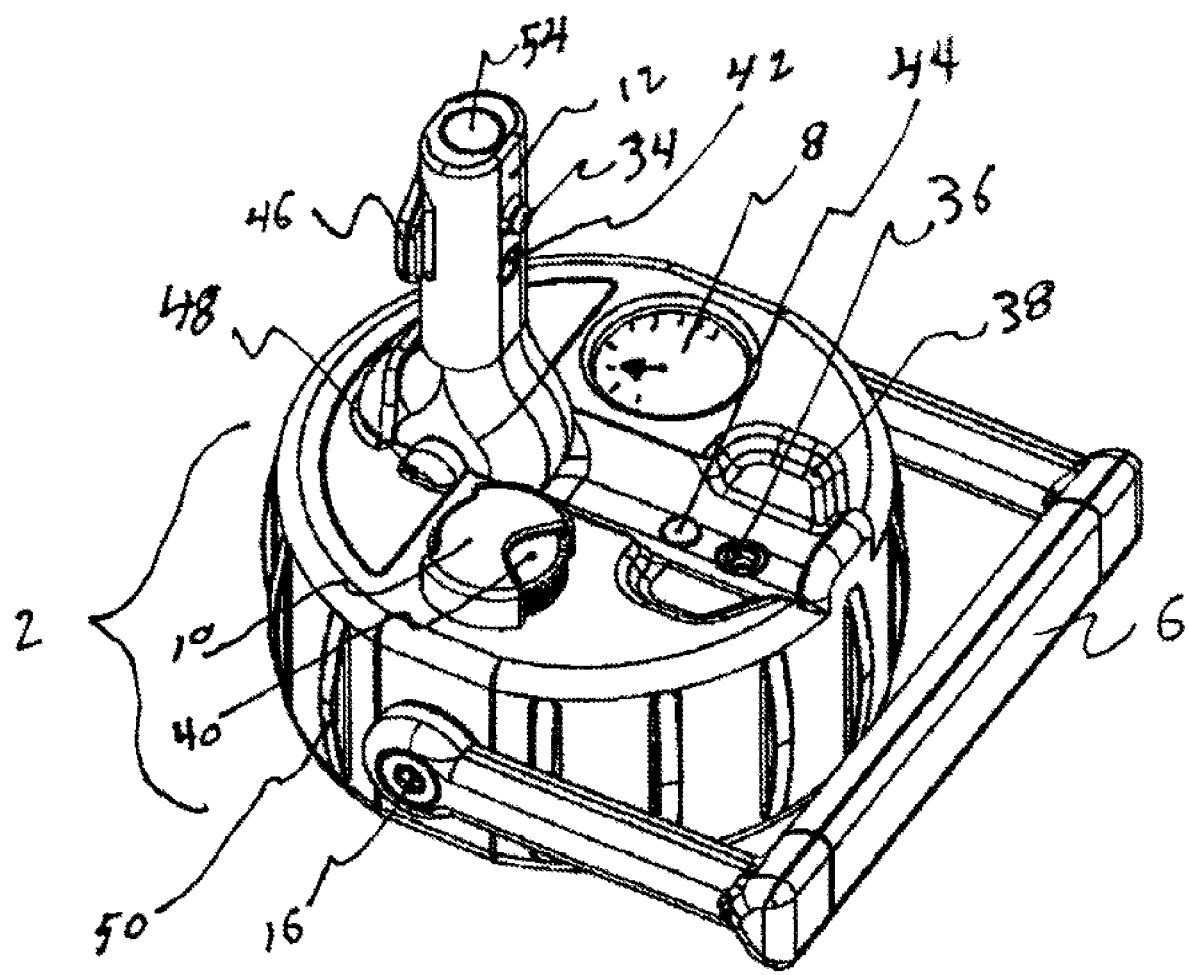
FIG. 5 is a perspective view of the lid with the pour spout opened.
Figure 8:
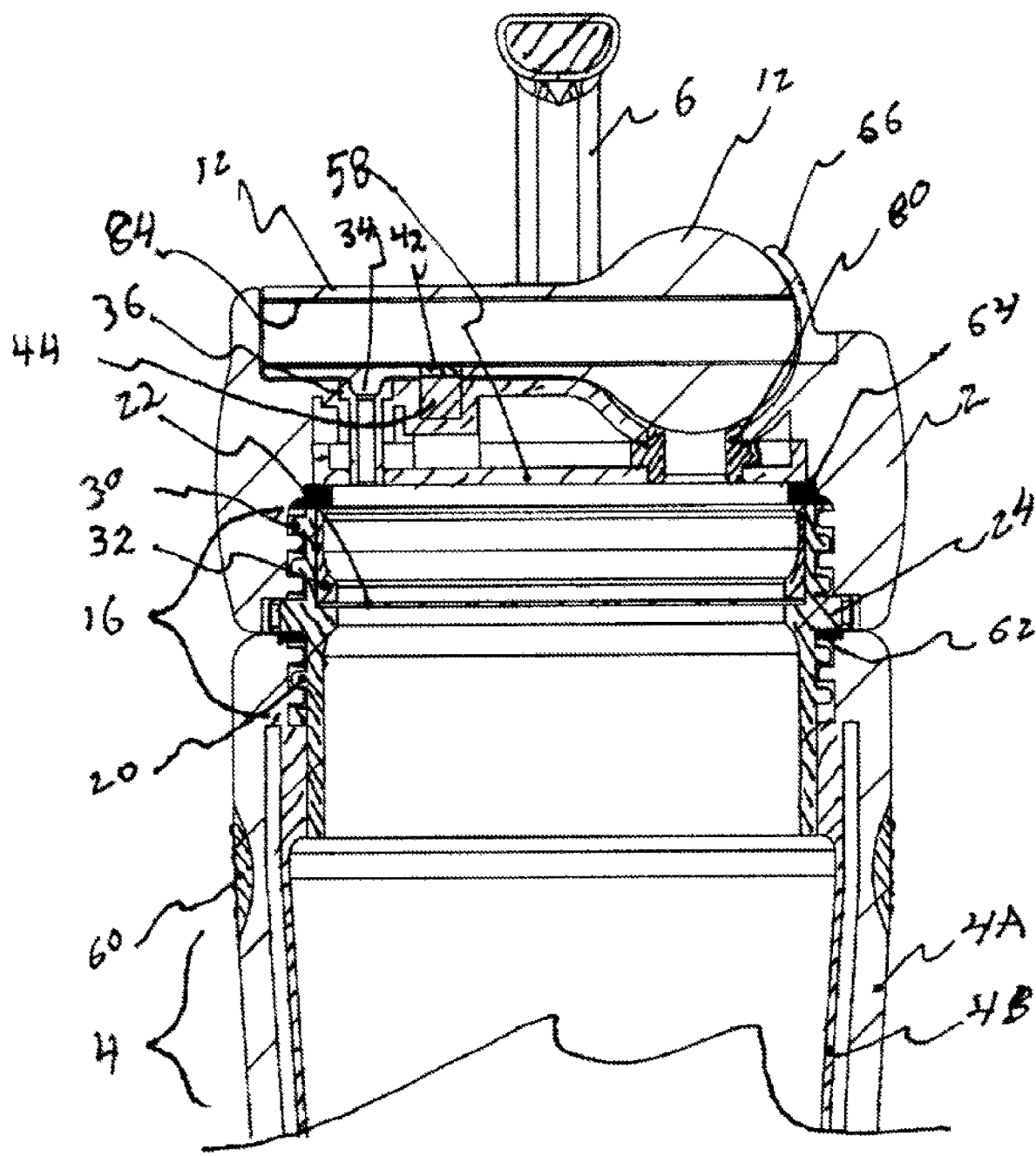
FIG. 8 is a side section view of the invention with the pour spout closed.

FIG. 5 is a perspective view of the lid 2 of the invention. In this preferred embodiment, a pour spout 12 is hingedly attached at point 48 and when lifted, allows the user to pour liquid out. The spout is lifted with the help of two identical symmetrically disposed lift tabs 46 on the right and left sides of the pour spout 12. Lift tabs 46 can be easily accessed because of depression 38. Only one of the two tabs 46 is visible, extending horizontally from the pour spout 12. When the spout 12 is lifted, a post 34 is dislodged from an aperture 36 allowing air to enter the aperture 36 to prevent vacuum conditions during the pouring activity. A magnet 42 engages a second magnet, or ferrous material 44 when the spout 12 is in the closed position thereby ensuring that the spout remains fully closed when not in use. The spout 12 includes aperture 54 that allows a beverage to be poured out. The aperture 54 is lined with stainless steel, as shown in FIG. 8, to ensure that the beverage does not touch plastic. A thermometer 8 allows the user to check on the temperature of the contents of the thermos 4. A coffee type indicator 10, 40 allows the user to set the rotatable disk 40 to a color quadrant that matches the color of the beverage enclosed n the thermos. For example, a decaf coffee may be signaled by an orange quadrant indicator, and a caffeinated coffee may be signaled by dark brown quadrant indicator. A thermos filled with an espresso may be signaled by a black quadrant indicator. A handle 6 is rotatably hinged at hinge point 16. A rubber washer within the hinge causes the handle 6 to remain in position wherever the user has set it. The handle 6, in the down position, also can act as an anti-roll device when the thermos 4 is set on its side.

Figure 6:
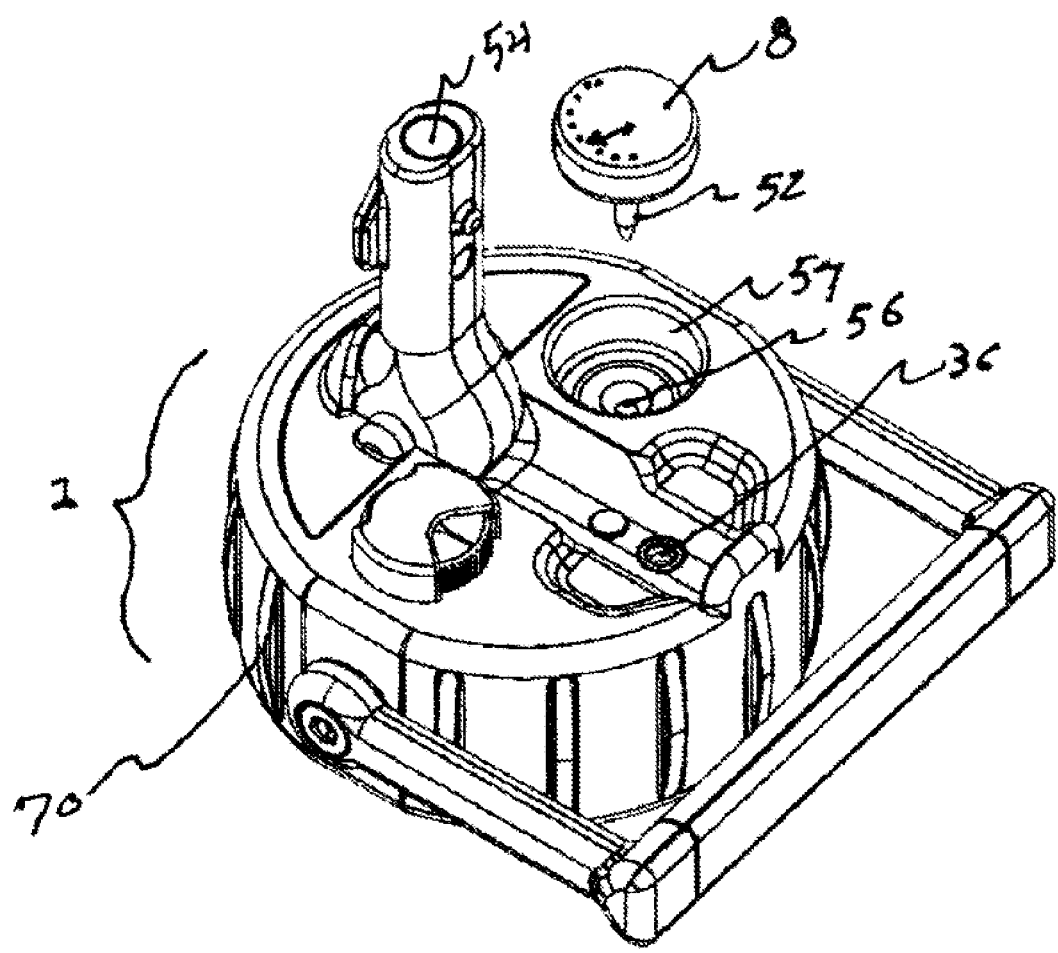
FIG. 6 is a perspective view of the lid with the thermometer removed.

FIG. 6 is a perspective view of the lid 2 with the bimetal thermometer 8 removed. Prong 52 is inserted into aperture 56 and the entire perimeter of the thermometer 8 rests inside recess 57. To measure the temperature of the contents of thermos 4, the user turns the thermos upside down so that the liquid contents is in full contact with prong 52 which contains a bi-metal temperature sensor that causes the hand of the thermometer dial to rotate to indicate the temperature of the contents of the thermos 4. Outer vertical ridges 70 improve the grip of the user when twisting open the lid 2.

Figure 7:
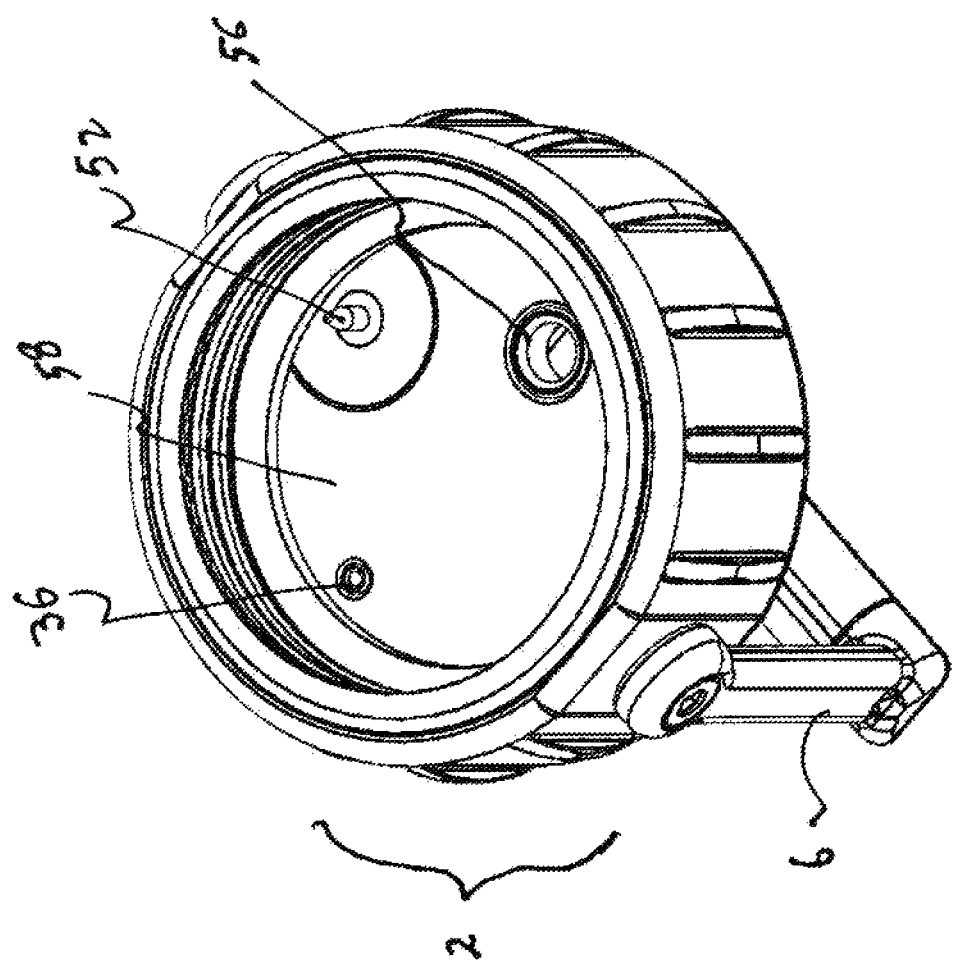
FIG. 7 is a perspective view of the underside of the lid.

FIG. 7 is a perspective view of the underside of lid 2. A stainless-steel plate 58 ensures that the contents of the thermos 4 do not touch plastic. Prong 52 is shown penetrating plate 58 so that it can measure temperature when the user turns the thermos 4 upside down. Aperture 36 is the air release for anti-vacuum protection during pouring. Aperture 56 is connected to the pour spout 12 to allow the beverage to be poured out of thermos 4.

FIG. 8 is a side section view of the invention with the pour spout 12 in closed position. Rubber gasket 80 provides a seal for the rotating cylindrical portion of the pour spout 12. Gasket 64 seals the space between the top of the screen retaining assembly 16 and the underside of the internal portion of the lid 2. Rubber gasket 62 seals the space between the top surface of the thermos 4 and the underside of outer ring 24 of the screen retaining assembly 16. The thermos 4 is comprised of an inner wall 4B and an outer wall 4A. The air space between the two walls is in vacuum condition to create ideal temperature insulation. Optionally, the inner wall 4B can be plated with copper to further increase the insulating ability of the thermos 4. Rubber grip rings 60 help the user hold the thermos 4 without slipping. Ring 32 retains screen member. 22. Magnets 42, 44 are touching thereby holding the spout 12 in the closed position. Post 34 is engaged with aperture 36 to close the air hole when not in use. Internal stainless-steel tube [[64 ensures that liquid contents do not touch plastic.

Figure 9:
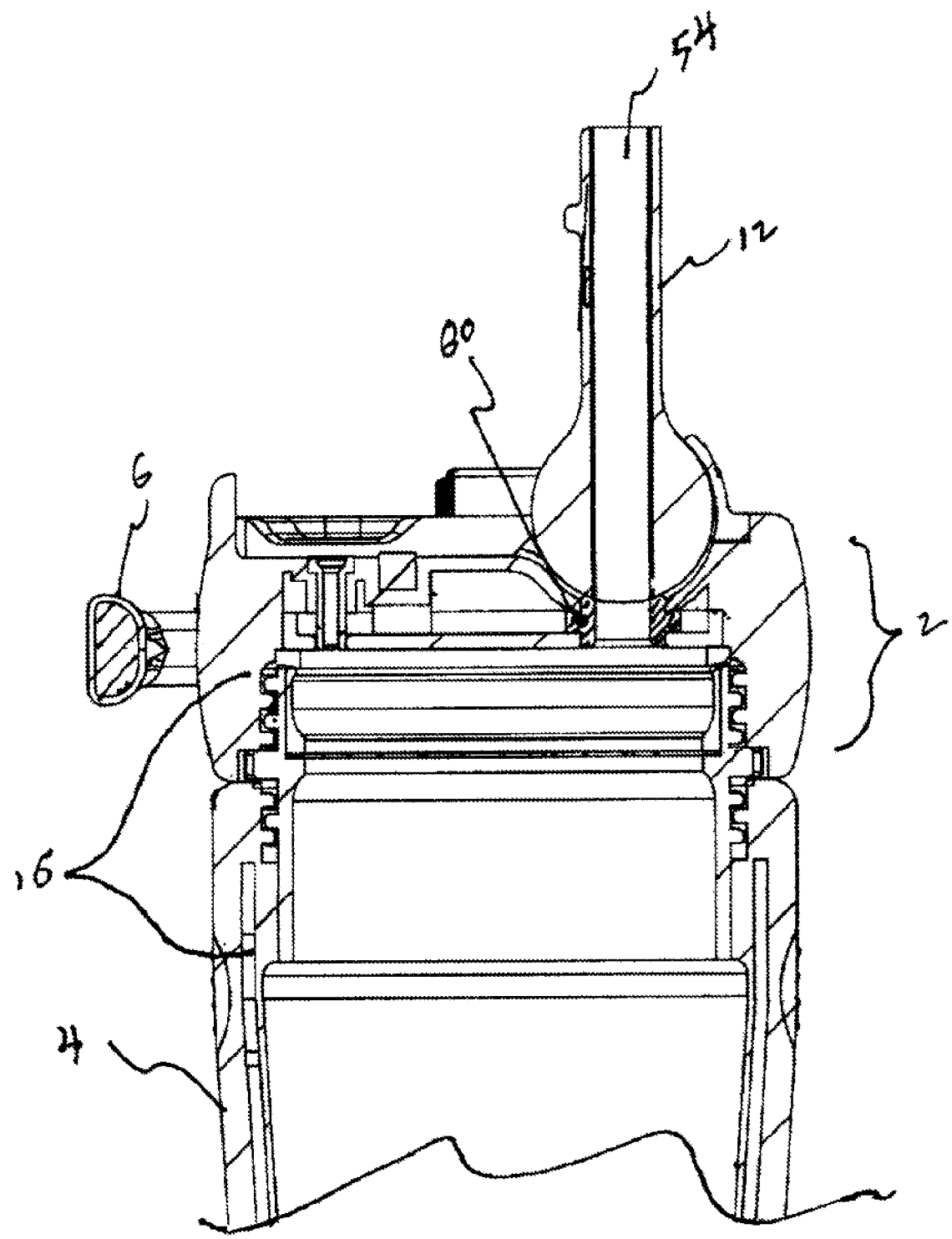
FIG. 9 is a side section view of the invention with the pour spout opened.

FIG. 9 is a side section view of the invention with the pour spout 12 in the open position. The main spout aperture 54 aligns with the aperture in gasket 60 allowing the free flow of the contents of thermos 4 to be poured out into a cup or other receptacle.

Figure 10:
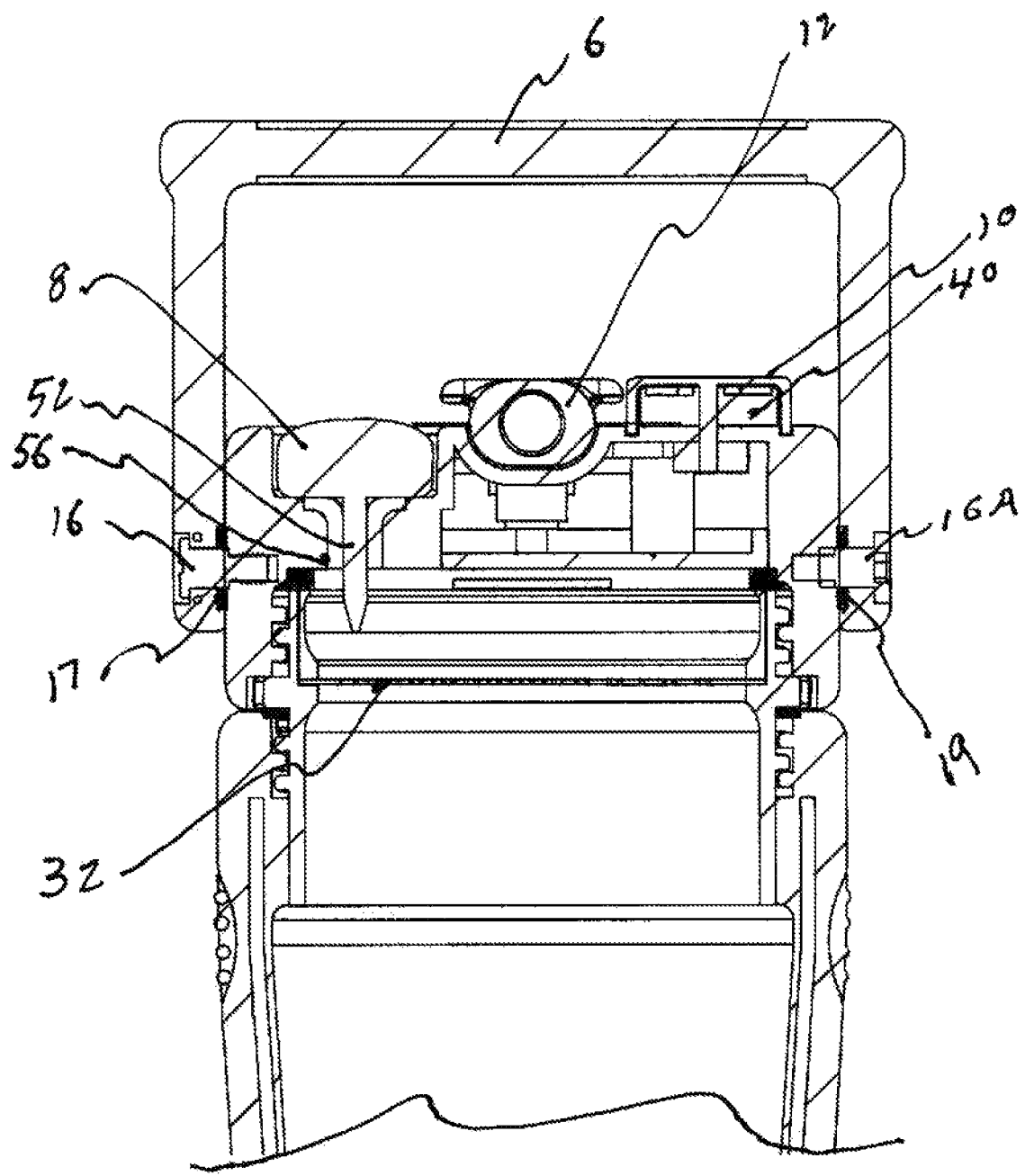
FIG. 10 is a front section view of the invention.

FIG. 10 is a front section view of the invention. Pour spout 12 is shown in the closed position. Thermometer 8 and prong 52 are clearly shown in place within Lid 2. Handle hinge pins 16, 16A are clearly shown. Rubber washers 17, 19 cause the handle 6 to remain in position after the user has adjusted the angle of the handle 6. This condition allows the handle to not flop over during a pour event. Coffee type indicator knob 40 is shown captured by overlay portion 10. The knob 40 can be rotated by the user to indicated the nature of the beverage contained within the thermos 4.

Figure 11:
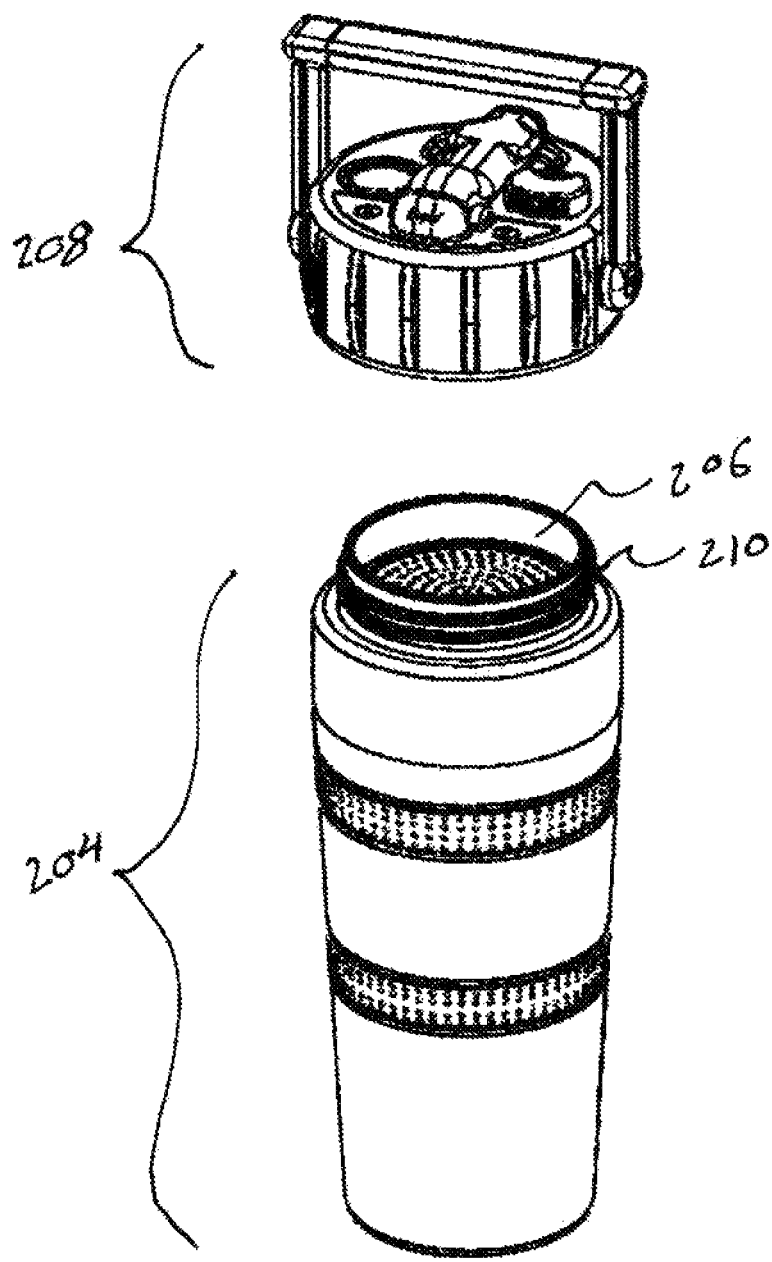
FIG. 11 is a perspective view of a second embodiment of the invention.

FIG. 11 is a perspective view of a second embodiment of the invention. In this embodiment the cap assembly 208 screws directly onto the threads 210 of thermos 204.

Figure 12:
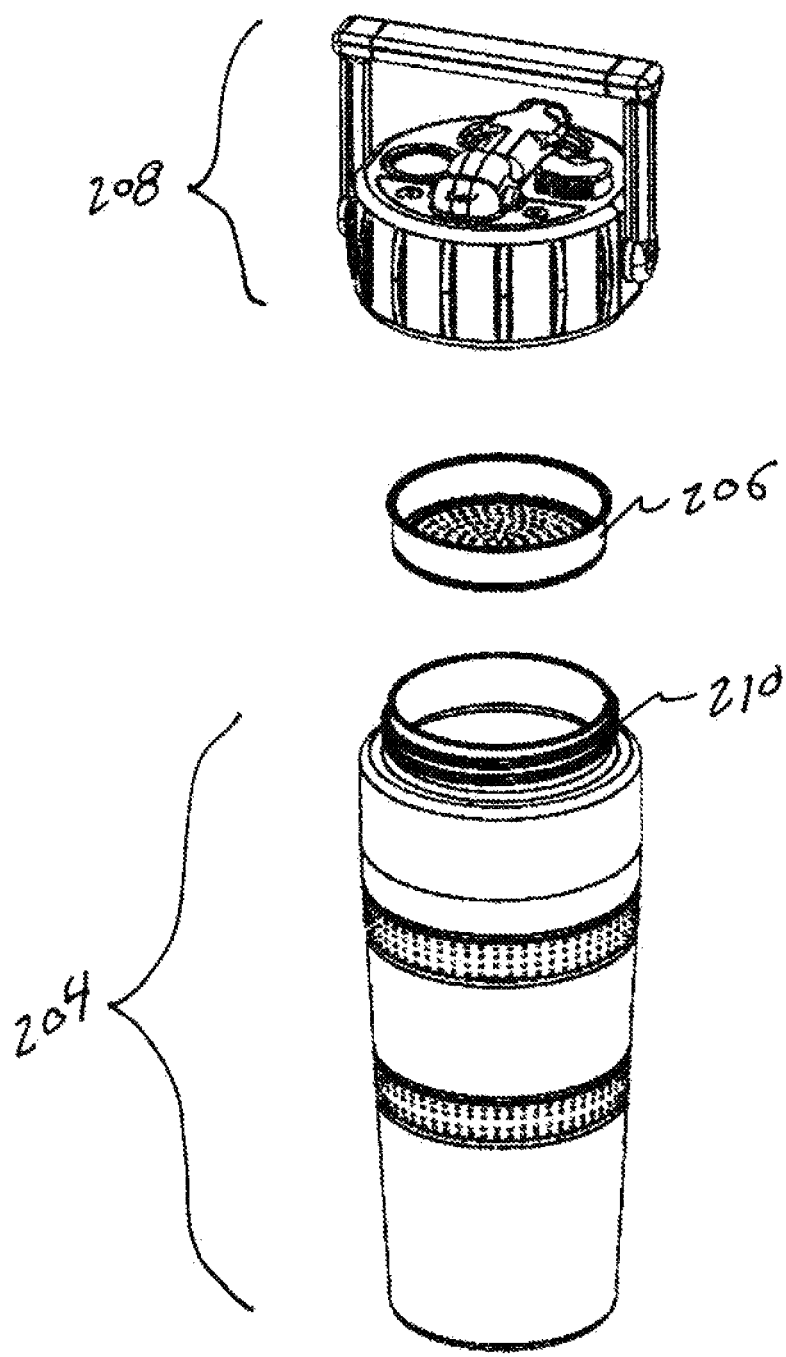
FIG. 12 is an exploded view of the second embodiment of the invention.
Figure 13:
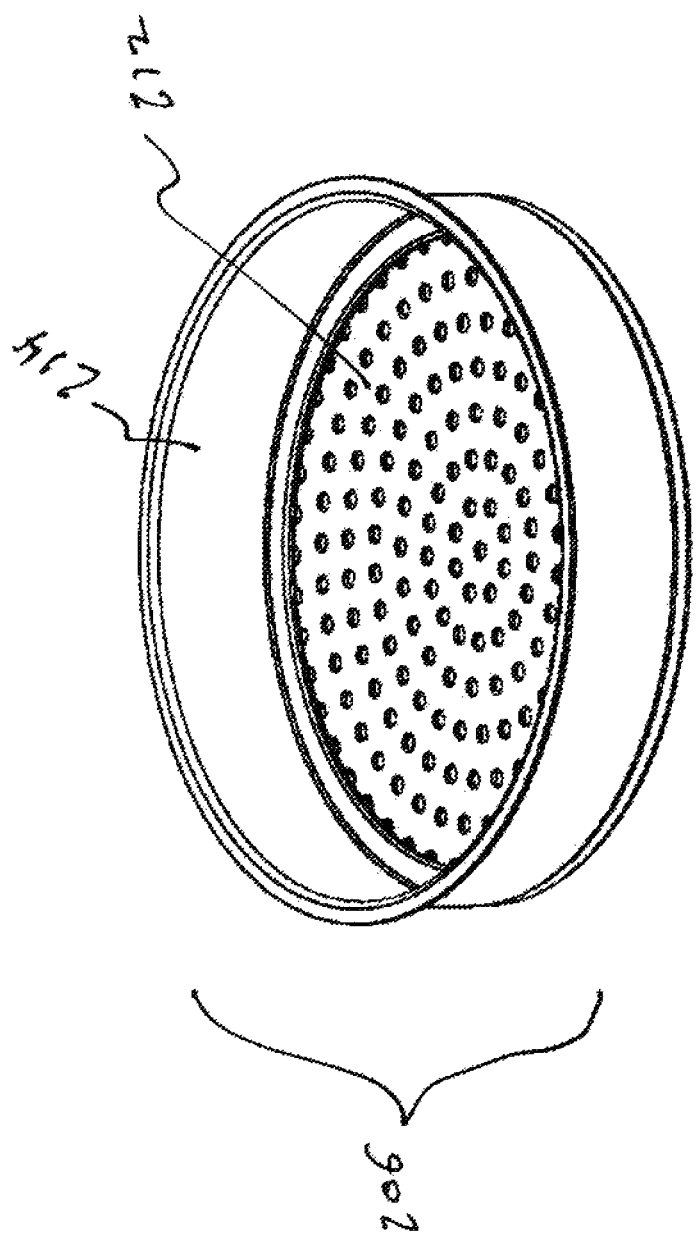
FIG. 13 is a perspective view of the screen portion of the second embodiment of the invention.

FIG. 12 is an exploded view showing the screen portion 206 removed from the cap 208 and thermos 204. The screen 212 is fixedly attached to cylindrical member 214 as shown in FIG. 13 which shows a perspective view of the screen portion 206.

Figure 14:
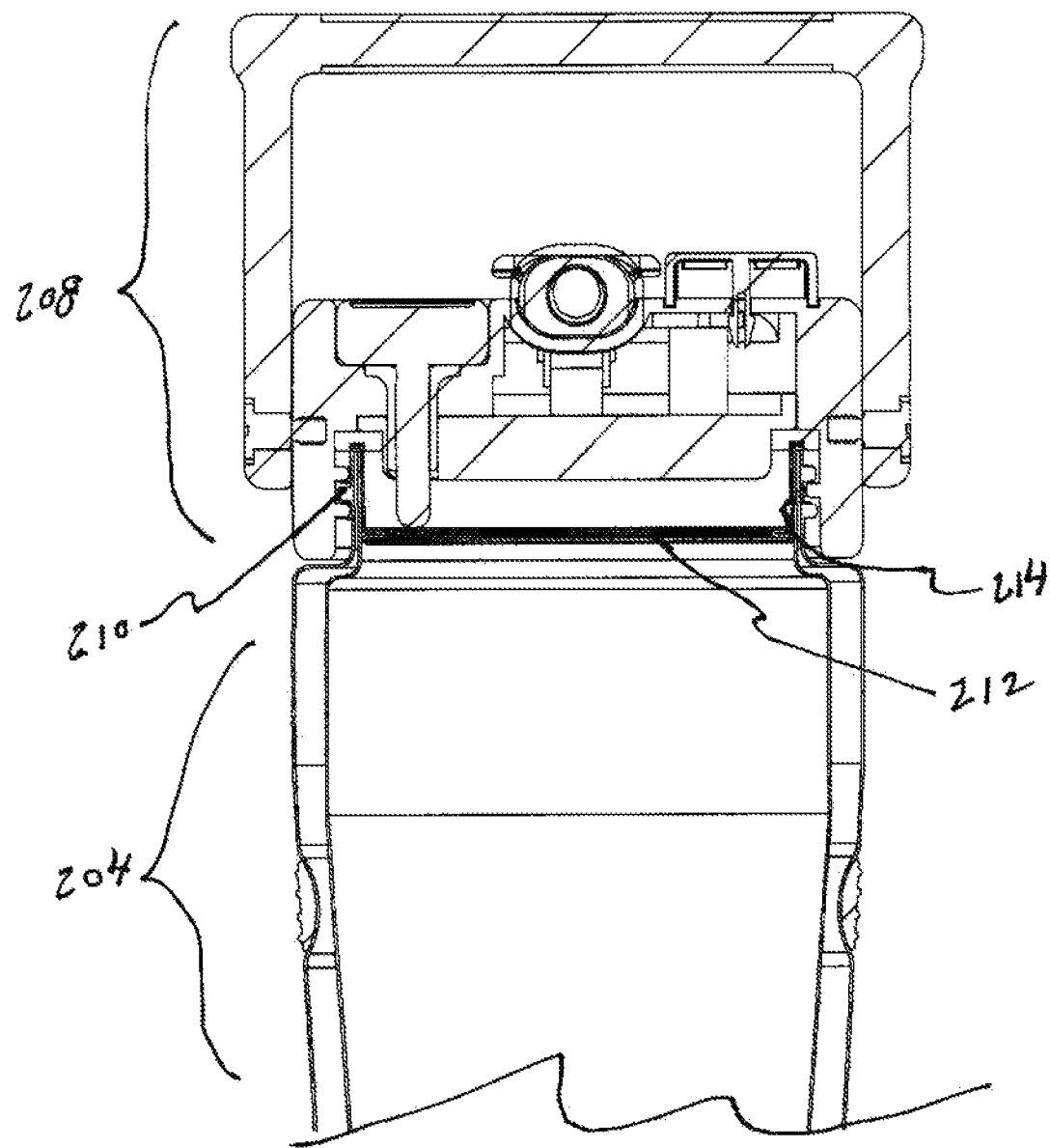
FIG. 14 is a partial section view of the second embodiment of the invention.

FIG. 14 is a partial section view of the second embodiment showing the cylindrical member 214 and attached screen member 212 trapped between the lid 208 and thermos 204. The lid 208 is shown as screwed onto thermos 204 via threads 210.

The entire invention 100 allows a person to brew coffee within a thermos under pressurized conditions and to pour out the coffee from the thermos without the coffee grounds coming out at the same time. Coffee type and temperature indicators built into the lid help the user to know what type of beverage is contained within the thermos and if the coffee is at a safe temperature to drink.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A Thermos Coffee Maker comprising:
    a main thermos body;
    a lid member;
    a screen member;
    a screen retaining assembly;
    a lid gasket;
    a screen retaining assembly gasket;
    said main thermos body having an open top where said top includes internal threads;
    said screen retaining assembly including an upper and lower externally threaded cylindrical member and a screen retaining ring;
    said lid member having internal threads and being threadably attached to the upper portion of said screen retaining assembly;
    said screen retaining assembly threadably attached at its lower end to the upper internally threaded portion of said main thermos body;
    said lid gasket located between the lower portion of said lid and an external ring located on the outer mid-section of said screen retaining assembly;
    said screen retaining assembly gasket located between the lower surface of said screen retaining assembly and the upper surface of said main thermos body;
    said screen member trapped between said screen retaining ring and a ledge located on the interior mid-section of said screen retaining assembly;
    allowing a user to pour ground coffee into said main thermos body, pouring hot water, screw on said lid member, allow said coffee to brew-steep, and pour said coffee out of said main thermos body and through said screen member thereby blocking said coffee grounds and allowing brewed coffee to be poured from said main thermos body.

2. The Thermos Coffee Maker as claimed in claim 1 further comprising said lid member having a closeable pour spout.

3. The Thermos Coffee Maker as claimed in claim 2 wherein said pour spout is held in the closed position by a magnet located on the underside of said pour spout and a magnet located on the upper surface of said lid.

4. The Thermos Coffee Maker as claimed in claim 2 wherein said closable pour spout comprises a spout body, wherein furthermore the spout body includes left and right extending lift panels extending from the upper portion of said spout body allowing said user to easily lift said pour spout when needed.

5. The Thermos Coffee Maker as claimed in claim 1 further comprising said lid member having a built-in thermometer and downwardly facing temperature probe allowing the user to read the temperature of the contents of the main thermos body.

6. The Thermos Coffee Maker as claimed in claim 1 further comprising said lid member having a coffee type indicator that can be set by said user to remind said user what type of coffee is inside said thermos main body.

7. The Thermos Coffee Maker as claimed in claim 1 wherein said lid member includes a carry handle.

8. The Thermos Coffee Maker as claimed in claim 7 wherein said handle can be rotated forward or backward to provide an antiroll feature for said coffee making thermos.

9. The Thermos Coffee Maker as claimed in claim 1 wherein said coffee making thermos can be used for brewing or simply retaining loose leaf hot or cold beverages.

* * * * *